(12) United States Patent
Peake

(10) Patent No.: US 8,131,415 B2
(45) Date of Patent: Mar. 6, 2012

(54) METHOD AND APPARATUS FOR AUTOMATIC VEHICLE GUIDANCE USING CONTINUOUS 2-D POLY-POINT PATH

(75) Inventor: John W. Peake, San Francisco, CA (US)

(73) Assignee: Trimble Navigation, Ltd, Sunnyvale, CA (US)

(*) Notice: Subject to any disclaimer, the term of this patent is extended or adjusted under 35 U.S.C. 154(b) by 972 days.

(21) Appl. No.: 12/080,975

(22) Filed: Apr. 7, 2008

(65) Prior Publication Data

US 2008/0275602 A1    Nov. 6, 2008

Related U.S. Application Data

(63) Continuation-in-part of application No. 11/137,742, filed on May 24, 2005, now abandoned.

(51) Int. Cl.
*G05D 1/00* (2006.01)
(52) U.S. Cl. ............................ 701/25; 701/23
(58) Field of Classification Search .................. 701/200, 701/23–25
See application file for complete search history.

(56) References Cited

U.S. PATENT DOCUMENTS

| | | | |
|---|---|---|---|
| 5,537,324 A | | 7/1996 | Nimura et al. |
| 5,708,427 A | * | 1/1998 | Bush ............................ 340/941 |
| 5,987,383 A | | 11/1999 | Keller et al. |
| 6,014,607 A | * | 1/2000 | Yagyu et al. .................. 701/202 |
| 6,377,889 B1 | | 4/2002 | Soest |
| 6,591,172 B2 | | 7/2003 | Oda et al. |

OTHER PUBLICATIONS

U.S. Appl. No. 11/137,742, Office Action dated Nov. 19, 2007, 5 pages.

* cited by examiner

*Primary Examiner* — Yonel Baeulieu
(74) *Attorney, Agent, or Firm* — Boris G. Tankhilevich

(57) ABSTRACT

A method for using an arbitrary shape 2-D poly-point path for an automatic vehicle guidance comprising the steps of: (A) determining a set of 2-D reference points; (B) selecting a set of 2-D interpolating curves to fit the set of 2-D reference points, wherein each 2-D interpolation curve connects a pair of 2-D reference points, and wherein each set of 2-D interpolation curves comprises a continuous 2-D poly-point path; and (C) calculating a steering angle to guide the vehicle along the continuous 2-D poly-point path.

23 Claims, 7 Drawing Sheets

METHOD AND APPARATUS FOR AUTOMATIC VEHICLE GUIDANCE USING CONTINUOUS 2-D POLY-POINT PATH

This is the continuation-in-part of the patent application Ser. No. 11/137,742, filed on May 24, 2005, now abandoned and entitled "METHOD AND APPARATUS FOR ARBITRARY SHAPE POLY-POINT PATH AUTOMATIC VEHICLE GUIDANCE".

BACKGROUND OF THE INVENTION

1. Field of the Invention

The present invention is in the field of control systems, and more specifically, is in the field of using an arbitrary shape poly-point path for automatic vehicle guidance.

2. Discussion of the Prior Art

The existing guidance systems guide a vehicle along a planned vehicle trajectory without taking into account its curvature. This leads to a vehicle path that is not optimized regarding a vehicle's cross track error (XTE), a vehicle's heading angle, and/or a path heading.

SUMMARY OF THE INVENTION

To address the shortcomings of the prior art, the present application discloses a method and an apparatus for optimized vehicle guidance along an arbitrary shape poly-point path that is optimized regarding a vehicle's cross track error (XTE), a vehicle's heading angle, and/or a path heading.

One aspect of the present invention is directed to a method for using an arbitrary shape 2-D poly-point path for automatic vehicle guidance.

In one embodiment, the method of the present invention comprises: (A) determining a set of 2-D reference points; (B) selecting a set of 2-D interpolating curves to fit the set of 2-D reference points; and (C) calculating a steering angle to guide the vehicle along the continuous 2-D poly-point path. In this embodiment of the present invention, each 2-D interpolation curve connects a pair of the 2-D reference points, whereas the set of 2-D interpolation curves comprises a continuous 2-D poly-point path.

In one embodiment of the present invention, the step (A) further comprises: (A1) using a master line to supply the set of 2-D reference points. In another embodiment of the present invention, the step (A) further comprises: (A2) using a Geographical Information System (GIS) to determine the set of 2-D reference points. In one additional embodiment of the present invention, the step (A) further comprises: (A3) navigating a vehicle to collect the set of 2-D reference points. In this embodiment of the present invention, the vehicle includes a navigational processor, and a memory block. In this embodiment of the present invention, a maximum number of the set of 2-D reference points is limited by the memory block and by an operational speed of the navigational processor.

In one embodiment of the present invention, the step (B) of selecting the set of interpolation curves to fit the set of 2-D reference points further comprises: (B1) selecting the set of 2-D interpolation curves based on a set of criteria selected from the group consisting of: {continuity of path; continuity of heading; and continuity of radius of curvature}.

In one embodiment of the present invention, the step (B1) further comprises: (B1, 1) of calculating a set of 2-D parameterized cubic spline functions.

In one embodiment of the present invention, the step (C) further comprises: (C1) determining the vehicle position at a guidance point; (C2) calculating a closest point to the vehicle position at the guidance point on a spline path; wherein the spline path is selected to interpolate the 2-D poly-point path; (C3) calculating a cross track error, a heading error, and a path heading rate for the vehicle position at the guidance point; (C4) using the cross track error and the heading error in a closed loop feedback to calculate a main component of a steering angle; and (C5) using an inverse kinematic model of the vehicle to translate the path heading rate into an additional component of the steering angle, wherein the additional component of the steering angle is configured to compensate for the spline path curvature.

In one embodiment of the present invention, the step (C1) further comprises: (C1, 1) using a source of position measurements to determine the vehicle position at the guidance point. The source of position measurement is selected from the group consisting of: {a carrier differential SATPS; a code differential SATPS; an autonomous SATPS; an Inertial Navigation System (INS); and a Pseudolite-Based Positioning System}.

Another aspect of the present invention is directed to a method for using an arbitrary shape 2-D poly-point path for an automatic vehicle guidance comprising: (A) determining an initial set of 2-D reference points in a sliding spline fit window; (B) calculating a set of 2-D parameterized cubic spline functions to fit the initial set of 2-D reference points located inside the sliding spline fit window; (C) selecting a guidance window located inside the sliding spline fit window; (D) calculating a steering angle to guide the vehicle along the continuous 2-D poly-point path while the vehicle is located inside the guidance window; and (E) if the guidance position of the vehicle is moved outside the guidance window, preferably repeating the steps (A-D).

In one embodiment of the present invention, the step (C) of selecting the guidance window located inside the sliding spline fit window further comprises: (C1) selecting a subset of substantially precise 2-D parameterized cubic spline functions configured to substantially precisely fit a subset of 2-D reference points located inside the guidance window. In this embodiment of the present invention, the subset of 2-D substantially precise parameterized cubic spline functions includes a set of coefficients that are substantially precise for guiding a vehicle located inside the guidance window.

One more aspect of the present invention is directed to an apparatus for automatic vehicle guidance by using an arbitrary shape 2-D poly-point path.

In one embodiment, the apparatus of the present invention comprises: (A) a means for determining a set of 2-D reference points; (B) a means for selecting a set of 2-D interpolating curves to fit the set of 2-D reference points; and (C) a means for calculating a steering angle to guide the vehicle along the continuous 2-D poly-point path. In this embodiment of the present invention, each 2-D interpolation curve connects a pair of the 2-D reference points, whereas the set of 2-D interpolation curves comprises a continuous 2-D poly-point path.

In one embodiment of the present invention, the means (A) further comprises a processor configured to use a given master line to determine the set of 2-D reference points. In another embodiment of the present invention, the means (A) further comprises a GIS configured to determine the set of 2-D reference points. In one more embodiment of the present invention, the means (A) further comprises a means configured to collect the set of 2-D reference points by navigating a vehicle. In this embodiment of the present invention, the vehicle includes a navigational processor and a memory block. In this embodiment of the present invention, a maximum number of the set of 2-D reference points is limited by the memory block and by an operational speed of the navigational processor.

In one embodiment of the present invention, the means (B) further comprises a means (B1) for selecting a set of 2-D interpolation curves based on a set of criteria selected from the group consisting of: {continuity of path; continuity of heading; and continuity of radius of curvature}

In one embodiment of the present invention, the means (B1) further comprises a means for calculating a set of 2-D parameterized cubic spline functions. In another embodiment of the present invention, the means (B1) further comprises a processor configured to calculate the set of 2-D parameterized cubic spline functions.

In one embodiment of the present invention, the means (C) further comprises: a means (C1) for determining the vehicle position at a guidance point; a means (C2) for calculating a closest point to the vehicle position at the guidance point on a spline path; wherein the spline path is selected to interpolate the 2-D poly-point path; a means (C3) for calculating a cross track error, a heading error, and a path heading rate for the vehicle position at the guidance point; a means (C4) for calculating a main component of a steering angle; and a means (C5) for translating the path heading rate into an additional component of the steering angle, wherein the additional component of the steering angle is configured to compensate for the spline path curvature.

In one embodiment of the present invention, the means (C1) further comprises a source of position measurements configured to determine the vehicle position at the guidance point. The source of position measurement is selected from the group consisting of: {a carrier differential SATPS; a code differential SATPS; an autonomous SATPS; an Inertial Navigation System (INS); and a Pseudolite-Based Positioning System}.

In one embodiment of the present invention, the means (C4) further comprises a closed loop feedback model configured to calculate a main component of a steering angle by using the cross track error and the heading error.

In one embodiment of the present invention, the means (C5) further comprises an inverse kinematic model of the vehicle configured to translate the path heading rate into an additional component of the steering angle, wherein the additional component of the steering angle is configured to compensate for the spline path curvature.

Yet, one more aspect of the present invention is directed to an apparatus for an automatic vehicle guidance by using an arbitrary shape 2-D poly-point path comprising: a means for determining an initial set of 2-D reference points in a sliding spline fit window; a means for calculating a set of 2-D parameterized cubic spline functions to fit the initial set of 2-D reference points located inside the sliding spline fit window; a means for selecting a guidance window located inside the sliding spline fit window; and a means for calculating a steering angle to guide the vehicle along the continuous 2-D poly-point path while the vehicle is located inside the guidance window.

In one embodiment of the present invention, the means for selecting the guidance window located inside the sliding spline fit window further comprises a means for selecting a subset of substantially precise 2-D parameterized cubic spline functions configured to substantially precisely fit a subset of 2-D reference points located inside the guidance window. In this embodiment of the present invention, the subset of 2-D substantially precise parameterized cubic spline functions includes a set of coefficients that are substantially precise to guide the vehicle located inside the guidance window.

BRIEF DESCRIPTION OF DRAWINGS

The aforementioned advantages of the present invention as well as additional advantages thereof will be more clearly understood hereinafter as a result of a detailed description of a preferred embodiment of the invention when taken in conjunction with the following drawings.

DETAILED DESCRIPTION OF THE PREFERRED AND ALTERNATIVE EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
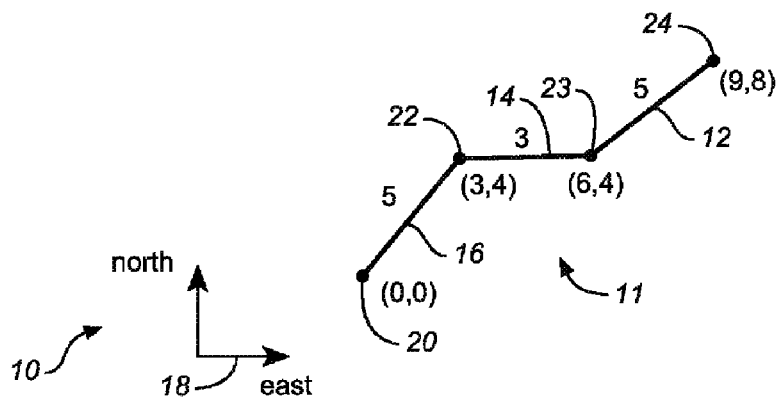
FIG. 1 depicts a poly-point path and linear distance calculation for the purposes of the present invention.

In one embodiment of the present invention, FIG. 1 depicts a poly-point path 11 comprising a number of 2-D reference points 20, 22, 23, and 24, and a number of straight lines 16, 14, and 12 connecting these points 20, 22, 23, and 24 in the North-East coordinate system 18.

More specifically, in one embodiment of the present invention, a master line is used to supply a set of 2-D reference points 20, 22, 23, and 24. In another embodiment of the present invention, a Geographical Information System (GIS) is used to determine the set of 2-D reference points 20, 22, 23, and 24. In one additional embodiment of the present invention, the set of 2-D reference points 20, 22, 23, and 24 is collected by driving a vehicle including a navigational processor 164 of FIG. 14, and a memory block 268 of FIG. 14. In this embodiment of the present invention, a maximum number of the set of 2-D reference points is limited by the memory block and by an operational speed of the navigational processor.

After the set of 2-D reference points is determined, one needs to select a set of 2-D interpolating curves to fit the set of 2-D reference points. Indeed, if a vehicle is driven by an AutoPilot along the straight line segments 16, 14, and 12, at the 2-D point 22 the vehicle has to instantly change its heading p, to follow the instant change in the radius of curvature to minimize its deviation from the original multi-point path 11, which is impossible. Instead, the vehicle that is navigated by AutoPilot strictly along the straight line segments 16, 14, and 12 overshoots.

The present invention deals with this problem by substituting the straight line segments 16, 14, and 12 with interpolating curves (not shown) in a way that the continuity of path, the continuity of heading, and the continuity of radius of curvature are preserved. This allows minimizing the vehicle's deviation from the original multi-point path 11.

Figure 2:
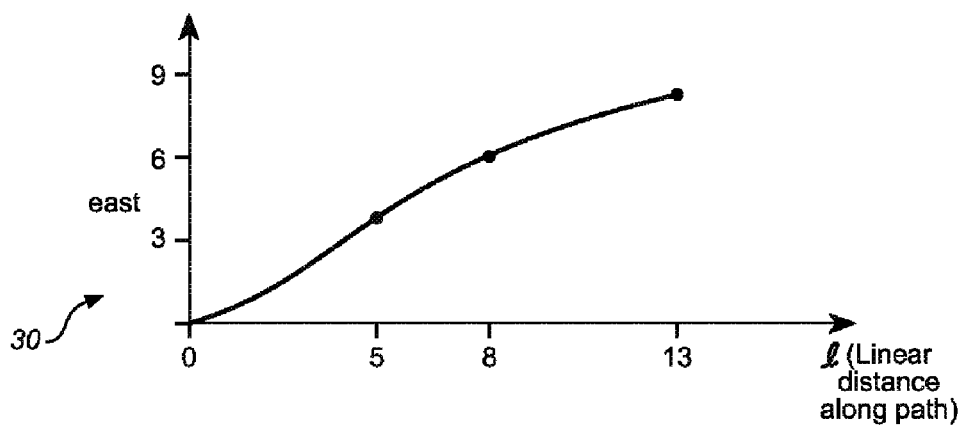
FIG. 2 shows the cubic spline fit of east vs. linear path distance for the purposes of the present invention.
Figure 3:
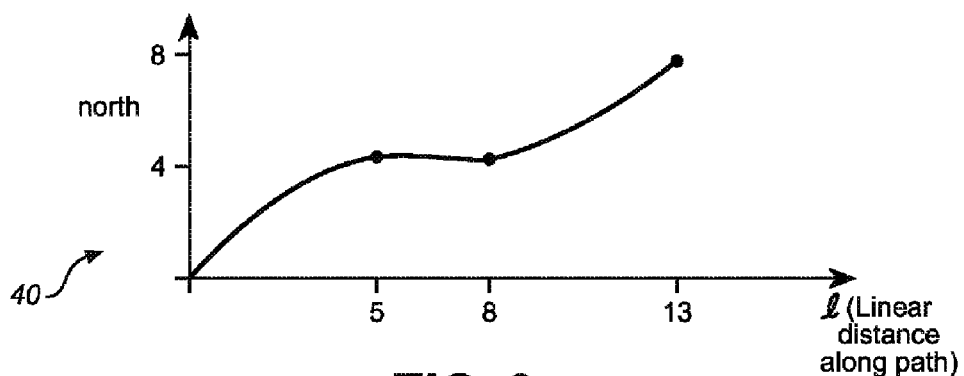
FIG. 3 illustrates the cubic spline fit of north vs. linear path distance for the purposes of the present invention.

In one embodiment of the present invention, the straight line segments 16, 14, and 12 are substituted by a set of 2-D parameterized cubic spline functions in a way that the continuity of path, the continuity of heading, and the continuity of radius of curvature are preserved. The cubic spline fit of east vs. linear path distance 30 is shown in FIG. 2, whereas the cubic spline fit of north vs. linear path distance 40 is shown in FIG. 3.

A cubic spline is a spline constructed of piecewise third-order polynomials which pass through a set of m control points. The second derivative of each polynomial is commonly set to zero at the endpoints, since this provides a boundary condition that completes the system of equations. This produces a so-called "natural" cubic spline and leads to a simple tridiagonal system which can be solved easily to give the coefficients of the polynomials. However, this choice is not the only one possible choice and other boundary conditions can be used instead. Cubic splines are implemented as Spline[pts, Cubic] in the Mathematica add-on package Graphics 'Spline' (which can be loaded with the command <<Graphics').

The simultaneous equations arising from the constraint that the 1st and 2nd derivatives match at each point, plus 2 additional criterion (in our case, fixing the 1st derivative (heading) at the two end points) result in a tridiagonal matrix. This is solved (inverted) fairly trivially by performing a single pass LU decomposition and forward substitution followed by a single pass of backward substitution. It is outlined in the *Chapter* 2. *Solution of Linear Algebraic Equations*", from *"NUMERICAL RECIPES IN C: THE ART OF SCIENTIFIC COMPUTING"*, published in 1988-1992 by Cambridge University Press.

Figure 4:
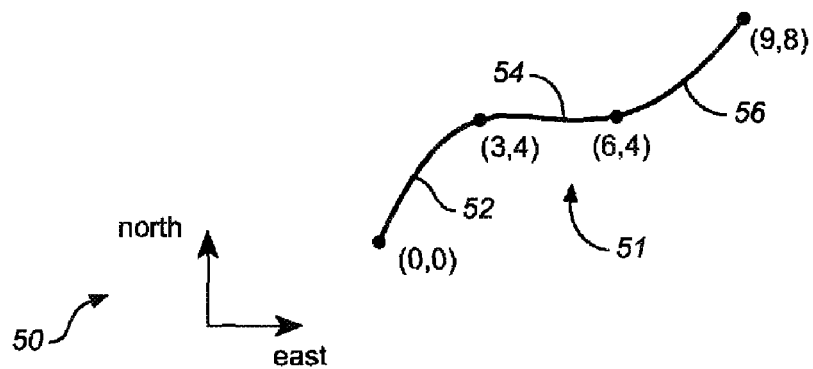
FIG. 4 shows the path resulting from two cubic spline functions that are used to interpolate the original path (of FIG. 1) for the purposes of the present invention.

FIG. 4 illustrates the path 51 resulting from two cubic spline functions that are used to interpolate the original path 11 (of FIG. 1).

After the original path (for example, path 11 of FIG. 1 comprises the segments of straight lines 16, 14, and 12) is interpolated by using spline functions (for example, path 51 of FIG. 4 comprises the segments of spline functions 52, 54, and 56), as was disclosed above, the next issue is to calculate a steering angle to guide the vehicle along the continuous interpolated 2-D poly-point path comprising the segments of spline functions.

In one embodiment of the present invention, the calculation of a steering angle to guide the vehicle along the continuous interpolated 2-D poly-point path comprising the segments of spline functions comprises the following steps: determining the vehicle position at a guidance point; calculating a closest point to the vehicle position at the guidance point on a spline path; calculating a cross track error, a heading error, and a path heading rate for the vehicle position at the guidance point; using the cross track error and the heading error in a closed loop feedback to calculate a main component of a steering angle; and using an inverse kinematic model of the vehicle to translate the path heading rate into an additional component of the steering angle, wherein the additional component of the steering angle is configured to compensate for the spline path curvature.

Figure 14:
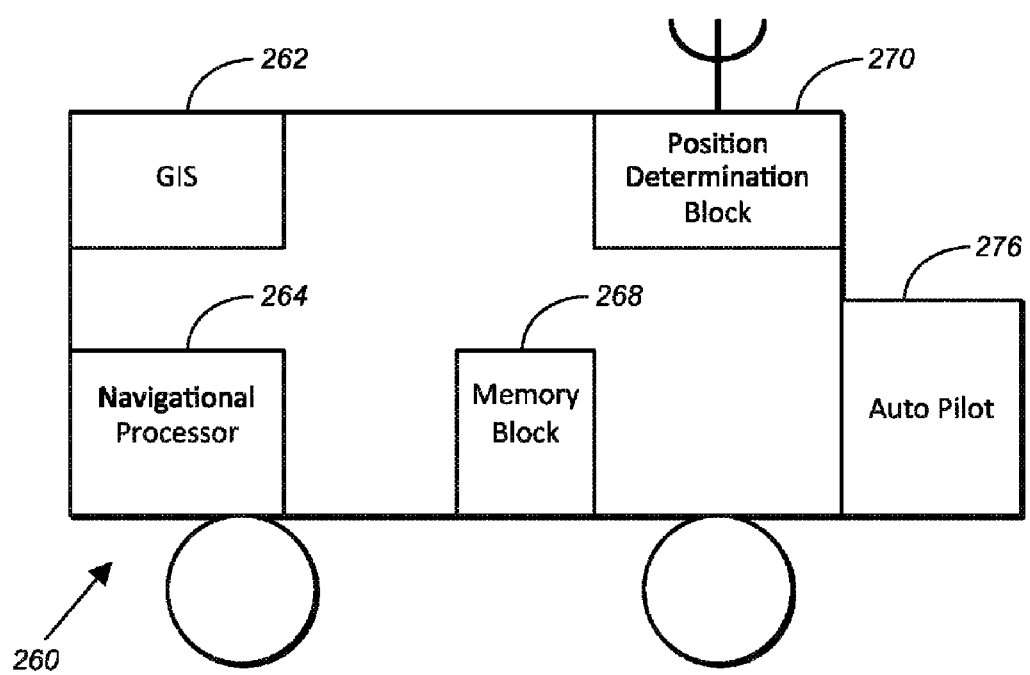
FIG. 14 depicts an apparatus of the present technology for automatic vehicle guidance using continuous 2-d poly-point path.

In one embodiment of the present invention, to determine the vehicle position at the guidance point one can use a source 270 of FIG. 14 of position measurement selected from the group consisting of: {a carrier differential SATPS; a code differential SATPS; an autonomous SATPS; an Inertial Navigation System (INS); and a Pseudolite-Based Positioning System}.

Example I

The Autonomous Satellite Positioning System includes a Satellite Positioning System—SATPS (GPS, GLONASS, GNSS, GALILEO, etc.), or a Terrestrial Radio Positioning or Navigation System (e.g. Loran, VOR/DME). The Autonomous Satellite Positioning System utilizes an Autonomous SATPS receiver B a position measurement device that measures the time it takes for signals to travel to it from each of several satellites. The time measurement is made by locking onto a code that the satellites send out at a carrier frequency, at a known time. The Autonomous SATPS receiver triangulates its own position by using the measured travel times of the signal from each satellite.

Example II

A Pseudolite-Based Positioning System includes a plurality of pseudolite transmitters positioned in known locations and a pseudolite receiver B a position measurement device that measures the time it takes for signals to travel to it from each of several pseudolite transmitters. The pseudolite receiver triangulates its own position by using the measured travel times of the signal from each pseudolite transmitter.

Example III

The Code Differential Satellite Positioning System includes a Differential GPS, or a differential GLONASS, or a WAAS DGPS, or a differential GNSS etc.
The Code Differential Satellite Positioning System uses a Code Differential SATPS receiver. The Code Differential SATPS receiver comprises a mobile Autonomous SATPS receiver, called the rover, and a stationary Autonomous SATPS receiver placed at a known reference position. The Code Differential SATPS receiver compares the position measurements calculated by the rover Autonomous SATPS receiver with the position measurements calculated by the stationary Autonomous SATPS receiver at a known reference position. Errors that are common to both receivers can be removed in this manner.

Example IV

The Carrier Differential SATPS uses a Carrier Differential SATPS receiver. The Carrier Differential SATPS receiver is similar to a code differential SATPS receiver. In the carrier differential SATPS, the rover receiver compares the phase of the carrier frequency of the signal sent to it from each satellite, with the phase measured at a second reference receiver at a known position. This is in addition to locking onto the code that the satellites sent out, as Autonomous SATPS receivers do. Errors that are common to both receivers can be removed with this method. The Carrier differential SATPS provides a higher accuracy position measurement than the code differential SATPS.

Example V

The Inertial Navigation System (INS) comprises a processor and sensors that measure linear acceleration (accelerometers) and/or sensors that measure rotational rate (gyroscopes). The outputs of these sensors of the INS are integrated by the processor to provide a position measurement as well as an attitude (orientation) measurement. The accuracy of the INS is characterized by the accuracy of its accelerometers and gyroscopes. The High Accuracy Inertial Navigation System (HAINS) uses high accuracy gyroscopes and accelerometers, whereas the Low Accuracy Inertial Navigation System (LAINS) utilizes low accuracy gyroscopes and accelerometers. High accuracy gyroscopes have a low drift and low noise in the measured angular rate, whereas low accuracy gyroscopes have a high drift and high noise in the measured angular rate. Similarly, high accuracy accelerometers have a low drift and low noise in the measured acceleration, and low accuracy accelerometers have a high drift and high noise in the measured acceleration. The Inertial Navigation System (INS) is usually used in a Kalman Filter (or other positioning filter) in combination with any other position measurement source, like Carrier Differential SATPS, Code Differential SATPS, or Autonomous SATPS.

Figure 5:
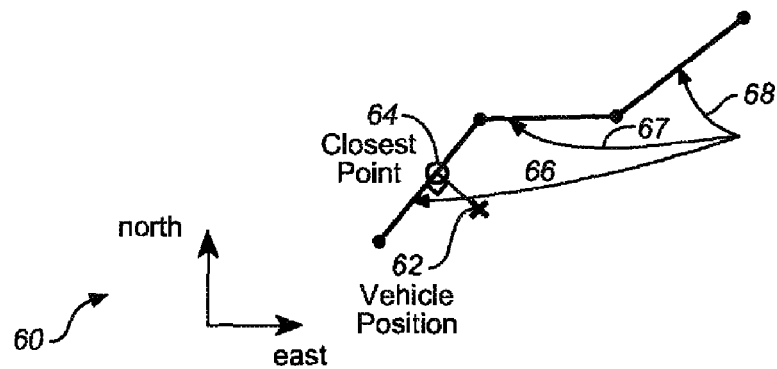
FIG. 5 illustrates the determination of the closest point on linearly interpolated path comprising the straight segments to the vehicle position for the purposes of the present invention.
Figure 6:
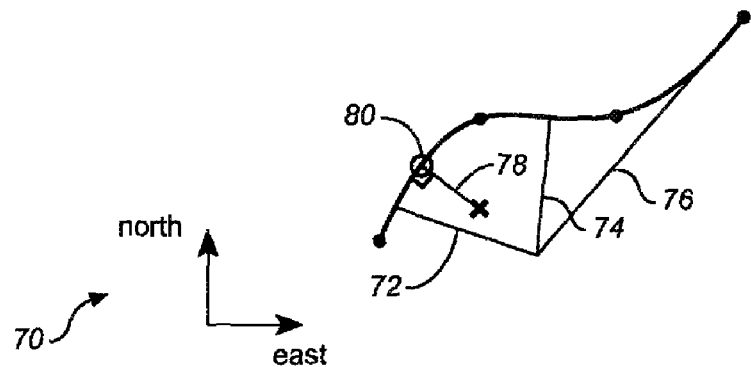
FIG. 6 depicts the determination of closest point on spline interpolated path comprising the spline segments to the vehicle position using a linear point as an initial guess for the purposes of the present invention.

In one embodiment of the present invention, FIG. 5 illustrates the determination of the closest point 64 on linearly interpolated path (comprising the straight segments 66, 67, and 68) to the vehicle position 62, whereas FIG. 6 depicts the determination of closest point 80 on spline interpolated path (comprising the spline segments 72, 74, and 76) to the vehicle position 78 using a linear point as an initial guess.

Figure 7:
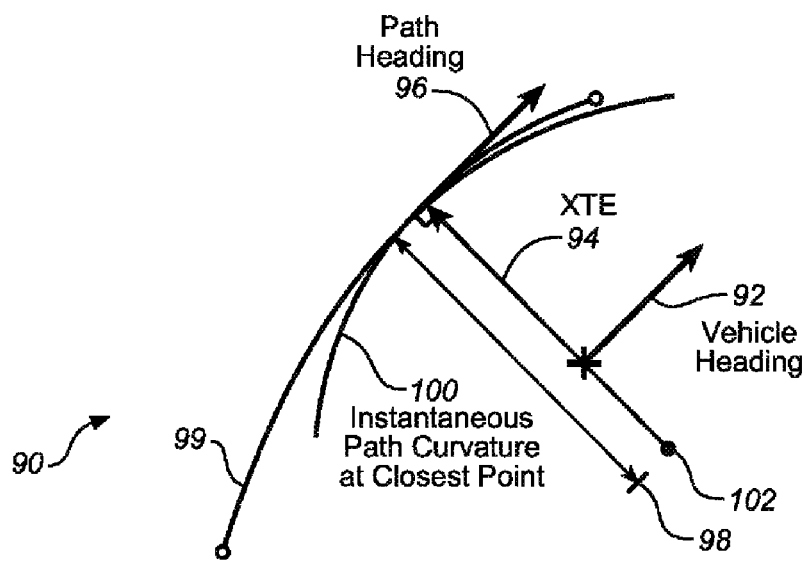
FIG. 7 shows calculation of cross track error (XTE), path heading and instantaneous path curvature at the closest point to the vehicle position for the purposes of the present invention.

In one embodiment of the present invention, FIG. 7 depicts calculation of cross track error (XTE) 94, path heading 96 and instantaneous path curvature 100 at the closest point 98 to the vehicle position 102.

Figure 8:
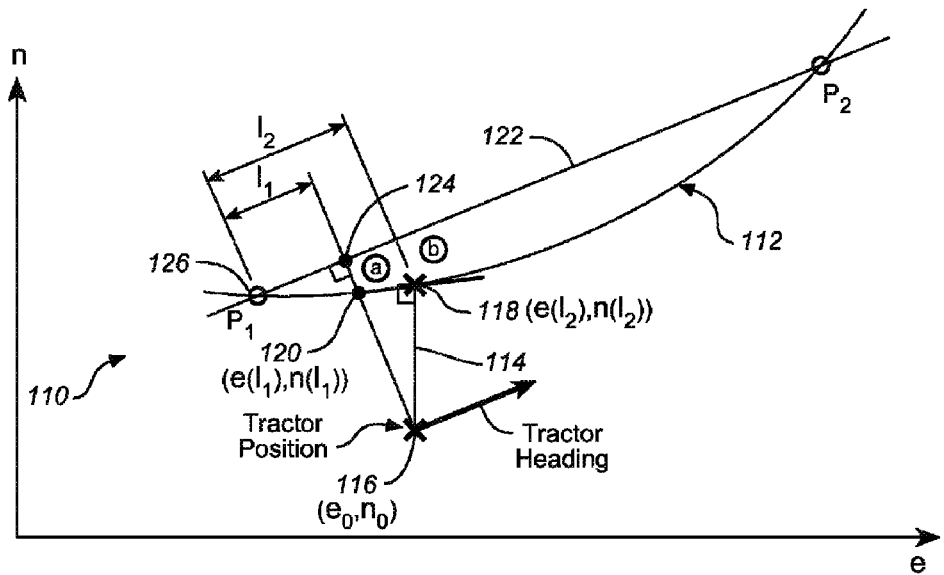
FIG. 8 illustrates how to find the point on the spline path with a normal that intersects the position of the tractor (thereby the closest point, local minima) by making the dot product of the spline point heading vector and the spline point to tractor vector equal to zero using Newton gradient descent on the dot product for the purposes of the present invention.

More specifically, in one embodiment of the present invention, FIG. 8 illustrates how to find the point b 118 on the spline path 112 with a normal 114 that intersects the position of the tractor 116 (thereby the closest point, local minima) by making the dot product of the spline point heading vector and the spline point to tractor vector equal to zero using Newton gradient descent on the dot product.

As shown in FIG. 8, $(e(l_1), n(l_1))$ is the point 120 on the spline fit 112 corresponding to the closest point a 124 on the linear path 122, whereas point b 118 $(e(l_2), n(l_2))$ is the point on the spline fit that is closest to the vehicle position 116 $(e_0, n_0)$.

The vehicle to path vector should be orthogonal to the heading of path vector at the right angle according to (Eq. 1):

$$(e(l)-e_0, n(l)-n_0) \cdot (\dot{e}(l), \dot{n}(l)) = 0 \qquad (\text{Eq. 1})$$

Figure 9:
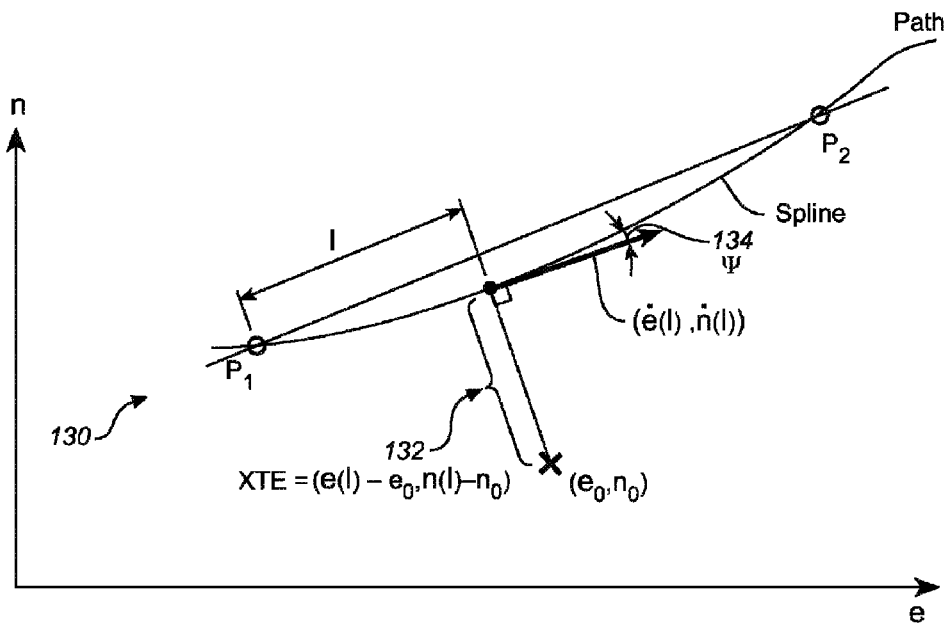
FIG. 9 shows how to calculate the cross track error XTE, heading $\psi$, and path curvature K; after the closest point on the spline path to the vehicle position is determined according to (Eq. 1).

As shown in FIG. 9, after the closest point on the spline path to the vehicle position is determined according to (Eq. 1), the cross track error XTE 132:

$$XTE = (e(l)-e_0, n(l)-n_0) \qquad (\text{Eq. 2})$$

heading $\psi$, 134:

$$\psi = (\dot{e}(l), \dot{n}(l)) \qquad (\text{Eq. 3})$$

and the path curvature $\kappa$ (not shown):

$$\frac{1}{\kappa} = \frac{(e(l)'^2 + n(l)'^2)^{3/2}}{|e(l)' n(l)'' - n(l)' e(l)''|} \qquad (\text{Eq. 4})$$

can be calculated.

Figure 10:
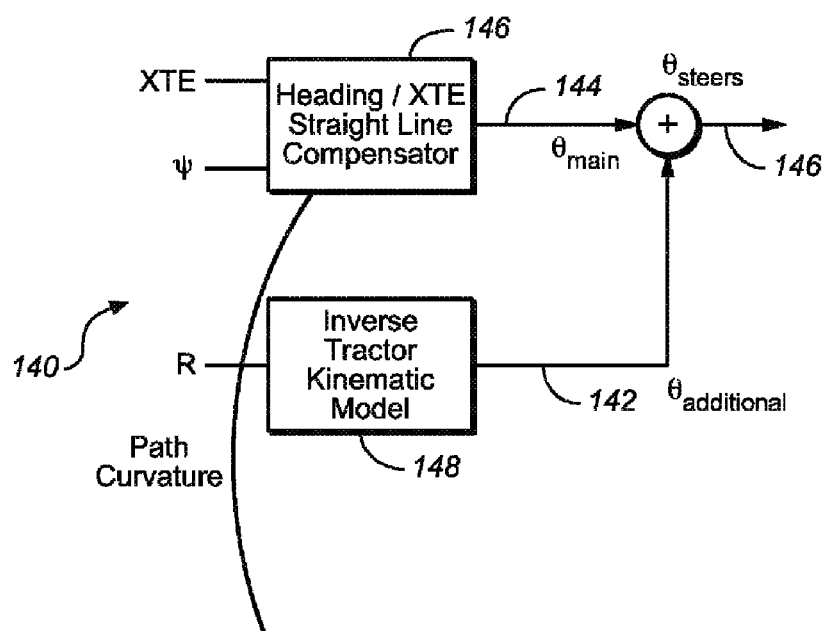
FIG. 10 is a diagram of the Control Compensator that illustrates how by using the cross track error XTE of (Eq. 2), and the heading error $\psi$ of (Eq. 3) in a closed loop feedback to calculate a main component $\theta_{main}$ of a steering angle, and how by using an inverse kinematic model of the vehicle to translate the path heading rate into an additional component $\theta_{additional}$ of the steering angle.

In one embodiment of the present invention, FIG. 10 is a diagram 140 of the Control Compensator that illustrates how by using the cross track error XTE of (Eq. 2), and the heading error $\psi$ of (Eq. 3) in a closed loop feedback to calculate a main component of a steering angle $\theta_{main}$ 144, and how by using an inverse kinematic model of the vehicle to translate the path heading rate into an additional component of the steering angle, more specifically, into a feed forward compensation of the steering angle $\theta_{path\_curvature\_compensation}$ for instantaneous spline path curvature $(R=1/\kappa)$ of (Eq. 4).

More specifically, in the Position, Integral, and Derivative (PID) controller closed loop model of the Heading/XTE straight line controller 146 (of FIG. 10) of the present invention, a main component of a steering angle $\theta_{main}$ 144 can be calculated as follows:

$$\theta_{main} = K_I \int XTE \, dt + K_P XTE + K_D dXTE/dt \qquad (\text{Eq. 5})$$

Figure 11A:
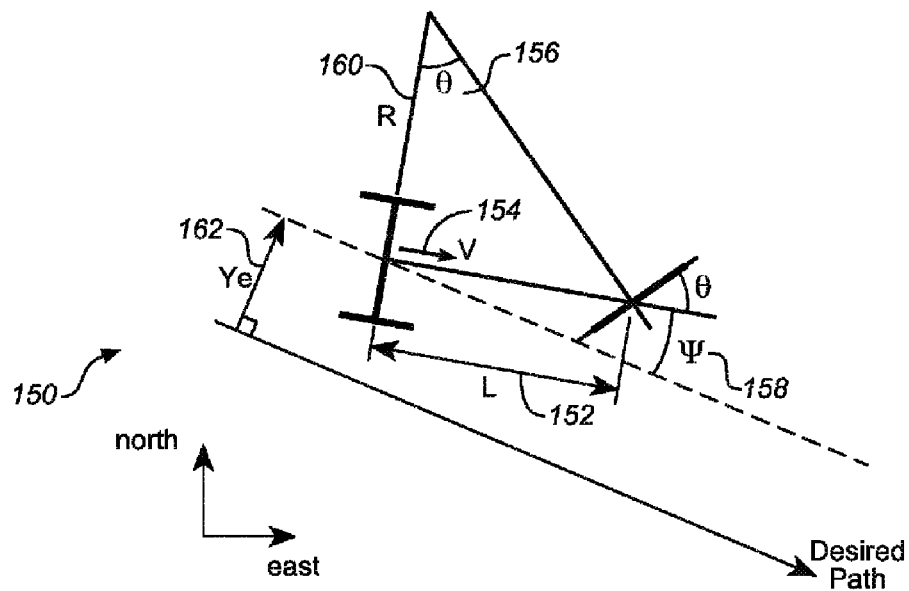
FIG. 11A illustrates a feedback compensator for straight-line vehicle guidance that is used to analyze a simplified vehicle model of a three-wheeled front steered tricycle.

In one embodiment of the present invention, the inverse tractor kinematic model 148 of FIG. 10 is reduced to a kinematics of a simplified vehicle model of a three-wheeled front steered tricycle. This simplified vehicle model of a three-wheeled front steered tricycle is analyzed by using a feedback compensator for straight-line vehicle guidance, as shown in diagram 150 of FIG. 11A, where: L 152 is the length of the vehicle wheelbase (m); V 154 is the vehicle velocity (m/s); $\theta$ 156 is the steering angle of the front wheel (the control input) (rad); $\psi$ 158 is the vehicle heading error relative to the path (rad); R 160 is the radius of curvature (m) of the vehicle's trajectory for a given $\theta$; and $y_e$ 162 is the cross track error/offline distance (m).

Thus the equations of motion that govern the rate of change of the position and heading relative to the desired path with time are:

$$\frac{d\psi}{dt} = \frac{V}{R} = \frac{V\tan(\theta)}{L} \quad \text{(Eq. 6)}$$

$$\frac{dy}{dt} = V\tan(\psi) \quad \text{(Eq. 7)}$$

By applying the small angle approximation for tan (θ) where tan(x)≈x for small angles these equations can be re-written in state space matrix form:

$$\begin{bmatrix} \dot{\psi} \\ \dot{y}_{xte} \end{bmatrix} = \begin{bmatrix} 0 & 0 \\ V & 0 \end{bmatrix} \begin{bmatrix} \psi \\ y_e \end{bmatrix} + \begin{bmatrix} V/L \\ 0 \end{bmatrix} \theta \quad \text{(Eq. 8)}$$

Using these equations we can now design a full state feedback compensator of the form:

$$\theta = -k_1\psi - k_2 y_e \quad \text{(Eq. 9)}$$

Where $k_1$ and $k_2$ are the feedback gains.

Figure 11B:
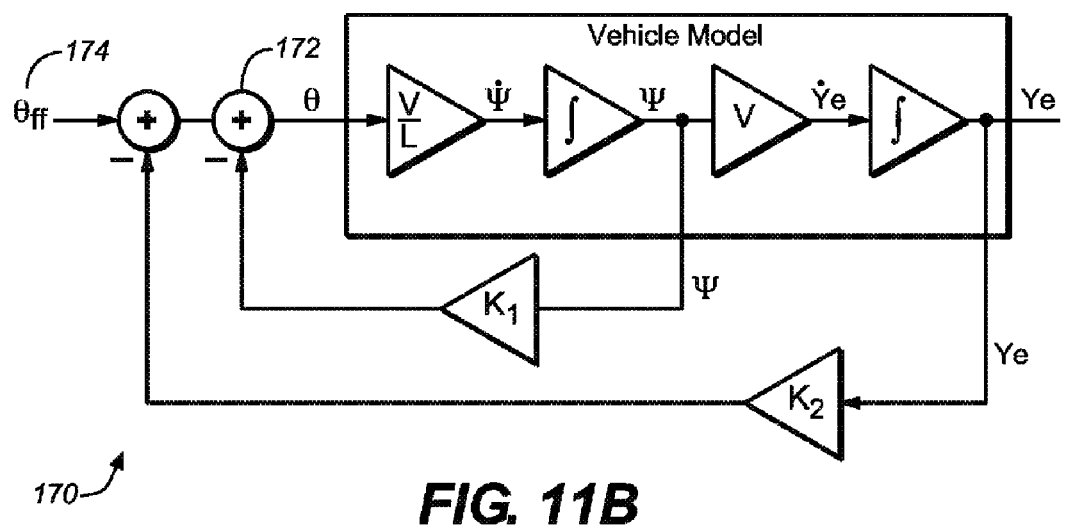
FIG. 11B is the flow diagram of the feedback compensator of FIG. 11A.

FIG. 11B illustrates the flow diagram 170 of a feedback compensator.

In matrix form, the feedback becomes:

$$\theta = -K\begin{bmatrix} \psi \\ y_e \end{bmatrix} = -[k_1 \; k_2]\begin{bmatrix} \psi \\ y_e \end{bmatrix} \quad \text{(Eq. 10)}$$

Substituting this into the state-space transfer function we get:

$$\begin{bmatrix} \dot{\psi} \\ \dot{y}_{xte} \end{bmatrix} = \begin{bmatrix} 0 & 0 \\ V & 0 \end{bmatrix}\begin{bmatrix} \psi \\ y_e \end{bmatrix} - \begin{bmatrix} V/L \\ 0 \end{bmatrix}[k_1 \; k_2]\begin{bmatrix} \psi \\ y_e \end{bmatrix} \quad \text{(Eq. 11)}$$

Now we want to place the poles of this system at a desired location to obtain a certain system response. To find the poles we can use the characteristic equation of this system, which is:

$$\det\left[sI - \left(\begin{bmatrix} 0 & 0 \\ V & 0 \end{bmatrix} - \begin{bmatrix} V/L \\ 0 \end{bmatrix}[k_1 \; k_2]\right)\right] = 0 \quad \text{(Eq. 12)}$$

$$\det\left[\begin{bmatrix} s & 0 \\ 0 & s \end{bmatrix} - \left(\begin{bmatrix} 0 & 0 \\ V & 0 \end{bmatrix} - \begin{bmatrix} V/L \\ 0 \end{bmatrix}[k_1 \; k_2]\right)\right] = 0 \quad \text{(Eq. 13)}$$

Computing the determinant gives:

$$s^2 + \frac{V}{L}k_1 s + \frac{V^2}{L}k_2 = 0 \quad \text{(Eq. 14)}$$

Now we can set the desired pole locations to be at P rad/s, i.e.

$$s^2 + 2Ps + P^2 = 0 \quad \text{(Eq. 15)}$$

Comparing the two equations (Eq. 14) and (Eq. 15), and equating equal powers of s gives:

$$k_1 = \frac{2PL}{V} \quad \text{(Eq. 16)}$$

$$k_2 = \frac{P^2 L}{V^2} \quad \text{(Eq. 17)}$$

Experimentally it can be shown that P=−1 gives good results on a typical vehicle, so $$k_1 = \frac{-2L}{V} \quad \text{(Eq. 18)}$$

$$k_2 = \frac{L}{V^2} \quad \text{(Eq. 19)}$$

where:
L is the vehicle baseline (m)
V is the vehicle speed (m/s)

Thus, in general the calculation of the steering angle θ (172 of FIG. 11B) can be obtained as follows:

$$\theta = \theta_{ff} + \frac{2L}{V}\psi - \frac{L}{V^2}y_e \quad \text{(Eq. 20)}$$

where $\theta_{ff}$ (174 of FIG. 11B) is the feed-forward angle computed from the path curvature and the vehicle baseline length.

Figure 12:
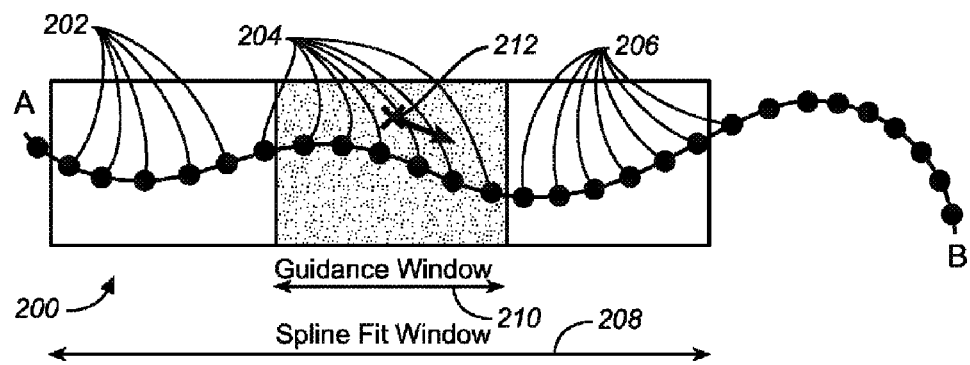
FIG. 12 depicts a diagram that illustrates a spline fit window including a spline fit curve that interpolates only a subset of points in the spline fit window.

In one embodiment of the present invention, FIG. 12 depicts a diagram 200 that illustrates a spline fit window including a spline fit curve that interpolates only a subset of points {inner 6 points 202, inner 6 points 204, and inner 6 points 206} in the spline fit window 208. Indeed, to reduce the CPU and memory requirements, especially when first preparing a master AB poly-path line, the splines are fit to only a small subset of points on the AB line at any given time—a "guidance window" 210. A guidance position 212 is located within the guidance window 210.

Figure 13:
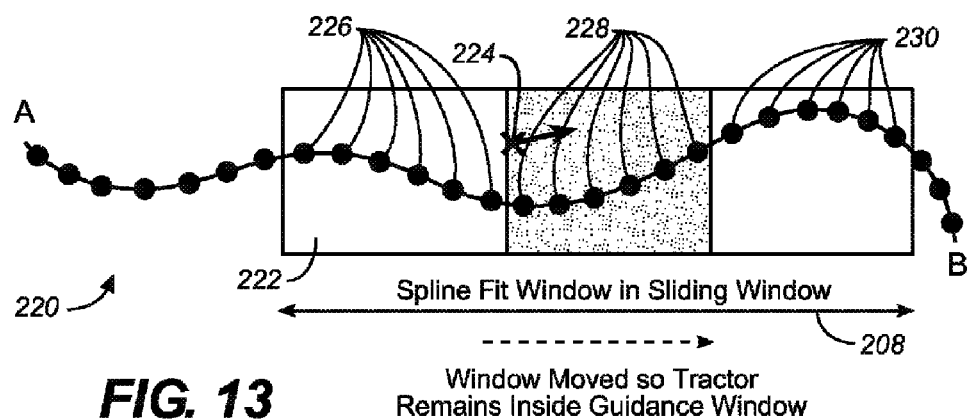
FIG. 13 shows that the spline fit window is a "sliding window". As the guidance position moves along the AB line, the window is moved and another spline fit performed to the new subset of points in the window.

FIG. 13 shows that the spline fit window 208 of FIG. 12 represents a "sliding window" 222. As the guidance position 224 moves along the AB line, the window is moved and another spline fit performed to the new subset of points {inner 6 points 226, inner 6 points 228, and inner 6 points 230} in the window 222.

This can be done because, for a given segment, the position of adjacent neighboring points has the most influence on the coefficients for that segment. The more points between a given point and the segment that one is using (or guiding to), the less influence it has on the coefficients of that segment. Hence, one can choose to ignore points far enough away from the segments of interest with little impact on the shape (and optimality) of the spline segments currently being guided to.

As shown in FIGS. 12, and 13, the three rectangles represent the sliding window, where the points inside the three rectangles are used to fit the spline curves, the points outside being ignored for the time being. Only the segments in the central window are considered to have accurate enough coefficients for guidance, and hence if the guidance position moves outside the central rectangle, as shown below, the window is moved. Now once again all three regions of points are used to fit the spline curves, but only the central set of segments (inner 6 points 204 of FIG. 12, or inner 6 points 228 of FIG. 13) are considered to have accurate enough coefficients to guide to.

One more aspect of the present invention is directed to an apparatus for automatic vehicle guidance by using an arbitrary shape 2-D poly-point path.

In one embodiment, the apparatus of the present invention comprises (not shown): (A) a means for determining a set of 2-D reference points; (B) a means for selecting a set of 2-D interpolating curves to fit the set of 2-D reference points; and (C) a means for calculating a steering angle to guide the vehicle along the continuous 2-D poly-point path. In this embodiment of the present invention, each 2-D interpolation curve connects a pair of the 2-D reference points, whereas the set of 2-D interpolation curves comprises a continuous 2-D poly-point path.

In one embodiment of the present invention, the means (A) further comprises (not shown) a processor configured to use a given master line to determine the set of 2-D reference points. In another embodiment of the present invention, the means (A) further comprises a GIS (262 of FIG. 14) configured to determine the set of 2-D reference points. In one more embodiment of the present invention, the means (A) further comprises (not shown) a means configured to collect the set of 2-D reference points by navigating a vehicle. In this embodiment of the present invention, the vehicle includes a navigational processor and a memory block. In this embodiment of the present invention, a maximum number of the set of 2-D reference points is limited by the memory block and by an operational speed of the navigational processor.

In one embodiment of the present invention, the means (B) further comprises (not shown) a means (B1) for selecting a set of 2-D interpolation curves based on a set of criteria selected from the group consisting of: {continuity of path; continuity of heading; and continuity of radius of curvature}.

In one embodiment of the present invention, the means (B1) further comprises (not shown) a means for calculating a set of 2-D parameterized cubic spline functions. In another embodiment of the present invention, the means (B1) further comprises a processor configured to calculate the set of 2-D parameterized cubic spline functions.

In one embodiment of the present invention, the means (C) further comprises (not shown): a means (C1) for determining the vehicle position at a guidance point; a means (C2) for calculating a closest point to the vehicle position at the guidance point on a spline path; wherein the spline path is selected to interpolate the 2-D poly-point path; a means (C3) for calculating a cross track error, a heading error, and a path heading rate for the vehicle position at the guidance point; a means (C4) for calculating a main component of a steering angle; and a means (C5) for translating the path heading rate into an additional component of the steering angle, wherein the additional component of the steering angle is configured to compensate for the spline path curvature.

In one embodiment of the present invention, the means (C1) further comprises (not shown) a source of position measurements configured to determine the vehicle position at the guidance point. The source of position measurement is selected from the group consisting of: {a carrier differential SATPS; a code differential SATPS; an autonomous SATPS; an Inertial Navigation System (INS); and a Pseudolite-Based Positioning System}.

In one embodiment of the present invention, the means (C4) further comprises (146 of FIG. 10) a closed loop feedback model configured to calculate a main component of a steering angle by using the cross track error and the heading error.

In one embodiment of the present invention, the means (C5) further comprises (150 of FIG. 11) an inverse kinematic model of the vehicle configured to translate the path heading rate into an additional component of the steering angle, wherein the additional component of the steering angle is configured to compensate for the spline path curvature.

Yet, one more aspect of the present invention is directed to an apparatus for an automatic vehicle guidance by using an arbitrary shape 2-D poly-point path comprising (not shown): a means for determining an initial set of 2-D reference points in a sliding spline fit window; a means for calculating a set of 2-D parameterized cubic spline functions to fit the initial set of 2-D reference points located inside the sliding spline fit window; a means for selecting a guidance window located inside the sliding spline fit window; and a means for calculating a steering angle to guide the vehicle along the continuous 2-D poly-point path while the vehicle is located inside the guidance window.

In one embodiment of the present invention, the means for selecting the guidance window located inside the sliding spline fit window further comprises (not shown) a means for selecting a subset of substantially precise 2-D parameterized cubic spline functions configured to substantially precisely fit a subset of 2-D reference points located inside the guidance window. In this embodiment of the present invention, the subset of 2-D substantially precise parameterized cubic spline functions includes a set of coefficients that are substantially precise to guide the vehicle located inside the guidance window.

The foregoing description of specific embodiments of the present invention has been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of automatic vehicle guidance comprising:
    (A) determining a set of 2-D reference points;
    (B) selecting a set of 2-D interpolating curves to fit said set of 2-D reference points, each said 2-D interpolation curve connecting a pair of said 2-D reference points; said set of 2-D interpolation curves comprising a continuous 2-D poly-point path;
    (C) calculating a steering angle;
    and
    (D) performing an automatic guidance of said vehicle along said continuous 2-D poly-point path.

2. The method of claim 1, wherein said step (A) further comprises:
    (A1) using a master line to supply said set of 2-D reference points.

3. The method of claim 1, wherein said step (A) further comprises:
    (A2) using a Geographical Information System (GIS) to determine said set of 2-D reference points.

4. The method of claim 1, wherein said step (A) further comprises:
    (A3) navigating a vehicle to collect said set of 2-D reference points; said vehicle including a navigational processor and a memory block; and wherein a maximum number of said set of 2-D reference points is limited by said memory block and by an operational speed of said navigational processor.

5. The method of claim 1, wherein said step (B) of selecting said set of interpolation curves to fit said set of 2-D reference points further comprises:
 (B1) selecting said set of 2-D interpolation curves based on a set of criteria selected from the group consisting of: continuity of path; continuity of heading; and continuity of radius of curvature.

6. The method of claim 5, wherein said step (B1) further comprises:
 (B1, 1) calculating a set of 2-D parameterized cubic spline functions.

7. The method of claim 1, wherein said step (C) further comprises:
 (C1) determining said vehicle position at a guidance point;
 (C2) calculating a closest point to said vehicle position at said guidance point on a spline path; wherein said spline path is selected to interpolate said 2-D poly-point path;
 (C3) calculating a cross track error, a heading error, and a path heading rate for said vehicle position at said guidance point;
 (C4) using said cross track error and said heading error in a closed loop feedback to calculate a main component of a steering angle; and
 (C5) using an inverse kinematic model of said vehicle to translate said path heading rate into an additional component of said steering angle, wherein said additional component of said steering angle is configured to compensate for said spline path curvature.

8. The method of claim 7, wherein said step (C1) further comprises:
 (C1, 1) using a source of position measurements to determine said vehicle position at said guidance point; said source of position measurement is selected from the group consisting of: a carrier differential SATPS; a code differential SATPS; an autonomous SATPS; an Inertial Navigation System (INS); and a Pseudolite-Based Positioning System.

9. A method of automatic vehicle guidance comprising:
 (A) determining an initial set of 2-D reference points in a sliding spline fit window;
 (B) calculating a set of 2-D parameterized cubic spline functions to fit said initial set of 2-D reference points located inside said sliding spline fit window;
 (C) selecting a guidance window located inside said sliding spline fit window;
 (D) guiding said vehicle along a continuous 2-D poly-point path by calculating a steering angle while said vehicle is located inside said guidance window; and
 (E) if the guidance position of said vehicle is moved outside said guidance window, repeating said steps (A-D).

10. The method of claim 9, wherein said step (C) of selecting said guidance window located inside said sliding spline fit window further comprises:
 (C1) selecting a subset of substantially precise 2-D parameterized cubic spline functions configured to substantially precisely fit a subset of 2-D reference points located inside said guidance window, said subset of 2-D substantially precise parameterized cubic spline functions having substantially precise coefficients for guidance said vehicle located inside said guidance window.

11. An apparatus for automatic vehicle guidance by using an arbitrary shape 2-D poly-point path, said apparatus comprising:
 (A) a processor configured to determine a set of 2-D reference points;
 (B) a processor configured to select a set of 2-D interpolating curves to fit said set of 2-D reference points, each said 2-D interpolation curve connecting a pair of said 2-D reference points; said set of 2-D interpolation curves comprising a continuous 2-D poly-point path; and
 (C) a processor configured to guide said vehicle by calculating a steering angle for said vehicle along said continuous 2-D poly-point path.

12. The apparatus of claim 11, wherein said processor (A) further comprises:
 (A1) a processor configured to use a given master line to determine said set of 2-D reference points.

13. The apparatus of claim 11, wherein said means processor (A) further comprises:
 (A2) a GIS configured to determine said set of 2-D reference points.

14. The apparatus of claim 11, wherein said processor (A) further comprises:
 (A3) a processor configured to collect said set of 2-D reference points by navigating a vehicle; said vehicle including a navigational processor and a memory block; and wherein a maximum number of said set of 2-D reference points is limited by said memory block and by an operational speed of said navigational processor.

15. The apparatus of claim 11, wherein said processor (B) further comprises:
 (B1) a processor configured to select said set of 2-D interpolation curves based on a set of criteria selected from the group consisting of: continuity of path; continuity of heading; and continuity of radius of curvature.

16. The apparatus of claim 15, wherein said means (B1) further comprises:
 (B1, 1) a processor configured to calculate said set of 2-D parameterized cubic spline functions.

17. The apparatus of claim 11, wherein said processor (C) further comprises:
 (C1);
 a source of position measurements configured to determine said vehicle position at said guidance point; said source of position measurement is selected from the group consisting of:
  a carrier differential SATPS; a code differential SATPS; an autonomous SATPS; an Inertial Navigation System (INS); and a Pseudolite-Based Positioning System;
 (C2) a processor configured to calculate a closest point to said vehicle position at said guidance point on a spline path; wherein said spline path is selected to interpolate said 2-D poly-point path;
 (C3) a processor configured to calculate a cross track error, a heading error, and a path heading rate for said vehicle position at said guidance point;
 (C4) a processor configured to calculate a main component of a steering angle; and
 (C5) a processor configured to translate said path heading rate into an additional component of said steering angle, wherein said additional component of said steering angle is configured to compensate for said spline path curvature.

18. The apparatus of claim 17, wherein said means (C1) further comprises:
 (C1, 1) said source of position measurement selected from the group consisting of:

a carrier differential SATPS; a code differential SATPS; an autonomous SATPS; an Inertial Navigation System (INS); and a Pseudolite-Based Positioning System.

19. The apparatus of claim 17, wherein said processor (C4) further comprises:
   (C4, 1) a closed loop feedback model configured to calculate a main component of a steering angle by using said cross track error and said heading error.

20. The apparatus of claim 17, wherein said processor (C5) further comprises:
   (C5, 1) an inverse kinematic model of said vehicle configured to translate said path heading rate into an additional component of said steering angle, wherein said additional component of said steering angle is configured to compensate for said spline path curvature.

21. An apparatus for automatic vehicle guidance by using an arbitrary shape 2-D poly-point path, said apparatus comprising:
   a processor configured to determine an initial set of 2-D reference points in a sliding spline fit window;
   a processor configured to calculate a set of 2-D parameterized cubic spline functions to fit said initial set of 2-D reference points located inside said sliding spline fit window;
   a processor configured to select a guidance window located inside said sliding spline fit window;
   and
   a processor configured to guide said vehicle along a continuous 2-D poly-point path by calculating a steering angle while said vehicle is located inside said guidance window.

22. The apparatus of claim 21, wherein said processor configured to select said guidance window located inside said sliding spline fit window further comprises:
   a processor configured to select a subset of substantially precise 2-D parameterized cubic spline functions configured to substantially precisely fit a subset of 2-D reference points located inside said guidance window, said subset of 2-D substantially precise parameterized cubic spline functions having substantially precise coefficients configured for guidance said vehicle located inside said guidance window.

23. The apparatus of claim 21, wherein said processor configured to select said guidance window located inside said sliding spline fit window further comprises:
   a processor configured to select a subset of substantially precise 2-D parameterized cubic spline functions configured for guidance said vehicle located inside said guidance window.

* * * * *